United States Patent
Harnik et al.

(10) Patent No.: US 9,916,320 B2
(45) Date of Patent: Mar. 13, 2018

(54) COMPRESSION-BASED FILTERING FOR DEDUPLICATION

(71) Applicant: International Business Machines Corporation, Armonk, NY (US)

(72) Inventors: Danny Harnik, Tel Mond (IL); Dmitry Sotnikov, Givataim (IL)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 14/696,441

(22) Filed: Apr. 26, 2015

(65) Prior Publication Data
US 2016/0314141 A1    Oct. 27, 2016

(51) Int. Cl.
*G06F 7/00* (2006.01)
*G06F 17/30* (2006.01)

(52) U.S. Cl.
CPC .. *G06F 17/30156* (2013.01); *G06F 17/30153* (2013.01)

(58) Field of Classification Search
CPC ......... G06F 17/30156; G06F 17/30153; G06F 7/5057; G06F 7/544; G06F 17/10; G06F 17/30946; G06F 17/30949; G06F 17/30952
USPC .......................... 707/692, 698, 694, 999.101
See application file for complete search history.

(56) References Cited

U.S. PATENT DOCUMENTS

| | | | |
|---|---|---|---|
| 5,974,455 A * | 10/1999 | Monier | G06F 17/30949 707/E17.036 |
| 6,374,266 B1 * | 4/2002 | Shnelvar | G06F 11/1453 |
| 6,674,908 B1 * | 1/2004 | Aronov | H03M 7/3088 382/232 |
| 7,634,657 B1 * | 12/2009 | Stringham | H04L 9/0643 380/251 |
| 7,834,784 B1 * | 11/2010 | Zhang | H03M 7/30 341/106 |
| 8,131,688 B2 * | 3/2012 | Popovski | G06F 17/30312 707/692 |
| 8,751,462 B2 | 6/2014 | Huang et al. | |
| 8,762,348 B2 * | 6/2014 | Lumb | G06F 3/0608 707/687 |
| 8,935,446 B1 * | 1/2015 | Shilane | G06F 12/0871 710/62 |

(Continued)

OTHER PUBLICATIONS

Cornel Constantinescu et al., "Mixing Deduplication and Compression on Active Data Sets", Data Compression Conference (DCC), 2011, pp. 393-402, IEEE.

(Continued)

*Primary Examiner* — Mohammed R Uddin
(74) *Attorney, Agent, or Firm* — Daniel Kligler

(57) ABSTRACT

Methods, computing systems and computer program products implement embodiments of the present invention that include configuring a storage system to store multiple storage entities, and defining, in a memory, a lookup table including multiple entries, each of the entries referencing a unique storage entity. Upon receiving a storage entity to be stored on the storage system, a compressibility of the received storage entity is determined upon detecting that the received storage entity is not identical to any of the unique storage entities referenced by the lookup table, and an entry referencing the received storage entity is added to the lookup table upon meeting a duplication condition based on the determined compressibility.

15 Claims, 2 Drawing Sheets

(56) References Cited

U.S. PATENT DOCUMENTS

| | | | | |
|---|---|---|---|---|
| 9,141,554 | B1* | 9/2015 | Candelaria | G06F 12/0864 |
| 9,405,761 | B1* | 8/2016 | Botelho | G06F 17/30138 |
| 2005/0152192 | A1* | 7/2005 | Boldy | G11B 20/12 |
| | | | | 365/189.05 |
| 2005/0288836 | A1* | 12/2005 | Glass | G09B 29/106 |
| | | | | 382/293 |
| 2007/0109153 | A1* | 5/2007 | Ma | H03M 7/3086 |
| | | | | 341/50 |
| 2010/0098318 | A1* | 4/2010 | Anderson | G06K 9/186 |
| | | | | 382/137 |
| 2011/0113016 | A1* | 5/2011 | Gruhl | H03M 7/30 |
| | | | | 707/661 |
| 2011/0125771 | A1* | 5/2011 | Gladwin | G06F 17/30067 |
| | | | | 707/758 |
| 2011/0185149 | A1* | 7/2011 | Gruhl | G06F 3/0608 |
| | | | | 711/206 |
| 2012/0166401 | A1* | 6/2012 | Li | G06F 17/3033 |
| | | | | 707/692 |
| 2013/0159255 | A1* | 6/2013 | Kaga | G06F 11/1458 |
| | | | | 707/640 |
| 2013/0179659 | A1* | 7/2013 | Seo | G06F 12/023 |
| | | | | 711/170 |
| 2013/0198150 | A1* | 8/2013 | Kim | G06F 17/30159 |
| | | | | 707/692 |
| 2013/0246372 | A1 | 9/2013 | Rao et al. | |
| 2013/0282672 | A1* | 10/2013 | Tashiro | G06F 3/0608 |
| | | | | 707/692 |
| 2013/0290276 | A1 | 10/2013 | Chambliss et al. | |
| 2014/0189432 | A1* | 7/2014 | Gokhale | G06F 17/30289 |
| | | | | 714/41 |
| 2014/0223029 | A1* | 8/2014 | Bhaskar | H03M 7/3088 |
| | | | | 709/247 |
| 2014/0279954 | A1* | 9/2014 | Aronovich | G06F 17/30371 |
| | | | | 707/692 |
| 2014/0337299 | A1 | 11/2014 | Therrien et al. | |
| 2014/0347331 | A1 | 11/2014 | Amit et al. | |
| 2015/0205716 | A1* | 7/2015 | Moon | G06F 12/0238 |
| | | | | 711/159 |
| 2015/0319268 | A1* | 11/2015 | Callard | H04L 65/607 |
| | | | | 709/231 |
| 2015/0356109 | A1* | 12/2015 | Arikawa | G06F 12/00 |
| | | | | 707/692 |
| 2016/0048531 | A1* | 2/2016 | Hubris | G06F 17/30153 |
| | | | | 707/693 |
| 2016/0165012 | A1* | 6/2016 | Li | H03M 7/3064 |
| | | | | 709/247 |

OTHER PUBLICATIONS

Cornel Constantinescu et al., "Quick Estimation of Data Compression and De-Duplication for Large Storage Systems", Data Compression, Communications and Processing (CCP), 2011 First International Conference on Jun. 21-24, 2011, pp. 98-102, IEEE.

Maohua Lu et al., "Insights for Data Reduction in Primary Storage: a Practical Analysis", SYSTOR '12 Proceedings of the 5th Annual International Systems and Storage Conference, Article No. 17.

* cited by examiner

COMPRESSION-BASED FILTERING FOR DEDUPLICATION

FIELD OF THE INVENTION

This invention relates generally to data deduplication, and specifically to using a given storage object's compressibility as a factor when deciding whether or not to add an entry to a deduplication lookup table for the given file.

BACKGROUND

Deduplication and compression are two data reduction techniques that differ in the scale and granularity in which they operate. Deduplication finds repeating storage entities (e.g., files) across large data sets and volumes that potentially store large amounts of data (e.g., multiple terabytes/petabytes). Compression refers to data reduction at a local scale (e.g., inside every storage entity considered for deduplication). One popular method for compression is the Lempel-Ziv factorization that uses repetition elimination. The difference between deduplication and repetition elimination is that repetition elimination works by finding repetitions of byte strings inside a stream of data, typically at a bounded distance apart from one another (e.g., up to 32 KB apart). Other compression methods include entropy encoding, run length encoding and various image and video compression methods (both lossy and lossless).

Storage systems that store many copies of identical data can greatly benefit from having built-in deduplication. Examples are systems with backups, replication across many users, or many instances of virtual machine images. In operation, deduplication of identical storage entities can be implemented by storing a single physical instance of the storage entity and multiple logical instances of the storage entity, each of the logical instance comprising a pointer to the physical instance of the storage entity.

The description above is presented as a general overview of related art in this field and should not be construed as an admission that any of the information it contains constitutes prior art against the present patent application.

SUMMARY

There is provided, in accordance with an embodiment of the present invention a method, including configuring a storage system to store multiple storage entities, defining, in a memory, a lookup table including multiple entries, each of the entries referencing a unique storage entity, receiving a storage entity to be stored on the storage system, determining a compressibility of the received storage entity upon detecting that the received storage entity is not identical to any of the unique storage entities referenced by the lookup table, and adding, to the lookup table, an entry referencing the received storage entity upon meeting a duplication condition based on the determined compressibility.

There is also provided, in accordance with an embodiment of the present invention an apparatus, including a storage device, a memory, and a processor configured to arrange the storage device to store multiple storage entities, to define, in the memory, a lookup table including multiple entries, each of the entries referencing a unique storage entity, to receive a storage entity to be stored on the storage device, to determine a compressibility of the received storage entity upon detecting that the received storage entity is not identical to any of the unique storage entities referenced by the lookup table, and to add, to the lookup table, an entry referencing the received storage entity upon meeting a duplication condition based on the determined compressibility.

There is further provided, in accordance with an embodiment of the present invention a computer program product, the computer program product including a non-transitory computer readable storage medium having computer readable program code embodied therewith, the computer readable program code including computer readable program code configured to define, in a memory, a lookup table including multiple entries, each of the entries referencing a unique storage entity that is not identical to any of the storage entities referenced by the lookup table, computer readable program code configured to receive a storage entity to be stored on the storage system, computer readable program code configured to determine a compressibility of the received storage entity upon detecting that the received storage entity is not identical to any of the unique storage entities referenced by the lookup table, and computer readable program code configured to add, to the lookup table, an entry referencing the received storage entity upon meeting a duplication condition based on the determined compressibility.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
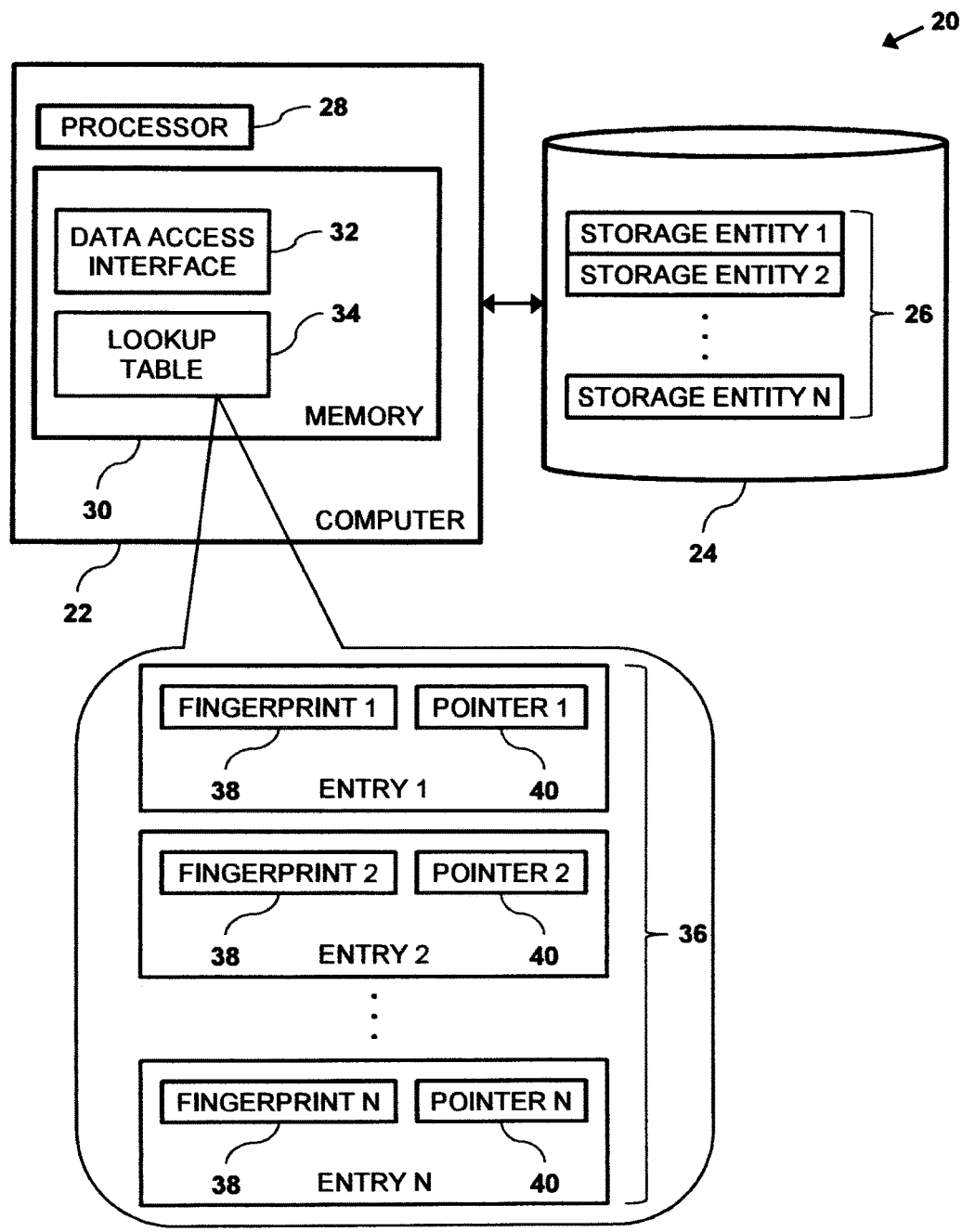
FIG. 1 is a block diagram that schematically illustrates a storage system configured to perform compression-based filtering for deduplication.

Storage systems can implement deduplication by computing a digital fingerprint for each storage entity written to the storage system. Examples of digital fingerprints include cryptographic hash functions such as SHA1 or SHA256. These fingerprints are typically stored in a fingerprint database that can be used to identify whether or not a newly written storage entity already exists in the system, and where it is located if it does exit.

If all fingerprints are in the database, then perfect deduplication can be achieved. However, any missing fingerprint may result in a missed deduplication opportunity, therefore resulting in storing additional physical copies of the same storage entity. While storing multiple copies of a given storage entity is not a problem in the sense that no data has been lost, it can negatively affect the data reduction ratio of the storage system. Therefore, the effectiveness of deduplication is typically dictated by an ability to store as many fingerprints as possible. However, in order to achieve high performance and throughput, the fingerprint database is usually stored in random access memory (RAM). Storing the database in RAM enables high rates of queries and updates to the database. However, at a large scale, the sheer number of fingerprints requires high amounts of RAM, which may cause resource and performance bottlenecks in the storage system.

Embodiments of the present invention provide methods and systems for filtering storage entities for deduplication according to their compression characteristics. The concept is that storage entities with high relative compression ratios will not take part in the deduplication process, thereby freeing the storage system's storage resources to handle more storage entities that are not as compressible.

As described hereinbelow, a storage system comprising one or more storage devices is configured to store multiple storage entities, and a lookup table (i.e., a fingerprint database) comprising multiple entries is defined in the storage system's volatile memory, each of the entries referencing a unique storage entity. Upon receiving a storage entity to be written to a given storage device, the compressibility of the received storage entity is determined upon detecting that the received storage entity is not identical to any of the unique storage entities referenced by the lookup table, and an entry referencing the received storage entity is added to the lookup table upon a duplication condition based on the determined compressibility.

Systems implementing embodiments of the present invention can store storage entities more efficiently since the benefit of deduplicating (i.e., as opposed compressing) a non-compressible storage entity is much higher than deduplicating a compressible storage entity. Therefore, selecting less compressible storage entities can ensure that the drop-off in data reduction ratio is mild once a memory bottleneck of a high-scale system is reached. This allows working with larger data sets without adding more resources while at the same time incurring only an insignificant loss in data reduction ratio.

FIG. 1 is a block diagram that schematically illustrates a storage system 20 configured to perform compression-based filtering for deduplication, in accordance with an embodiment of the present invention. Storage system 20 comprises a computer 22 and one or more storage devices 24 that store multiple storage entities 26. Examples of storage devices 24 include, but are not limited to, hard disk drives and solid state disk drives. In embodiments described herein the term storage entity denotes a granularity of deduplication used by storage system 20. Examples of storage entities include, but are not limited to, chunks, blocks, files, and objects.

Computer 22 comprises a processor 28 and a memory 30. Memory 30 typically comprises one or more volatile random access memory (RAM) modules. In operation, processor 28 executes a data access interface 32 that enables any other software applications (not shown) executing on the processor to access storage entities 26. Examples of file system 32 include file systems and data interfaces that utilize block devices and object storage. In operation, the data access interface maintains a data structure (e.g., a directory) that maps files to locations on storage device 24.

In addition to data access interface 32, memory 30 stores a lookup table 34 comprising multiple entries 36. In embodiments of the present invention, for each given unique storage entity 26, processor 28 calculates a respective digital fingerprint 28 (e.g., a hash calculation) for the given unique storage entity, and stores, to a given entry 36, the respective digital fingerprint and a pointer 40 referencing the given unique storage entity.

For example, the data access interface's data structure may comprise a directory, and each entry in the directory references (e.g., pointers) to a given storage entity 26 (e.g., a given file). In embodiments of the present invention, multiple directory entries can reference the same storage entity 26 (i.e., the given file).

In operation, processor 28 can logically store multiple copies of a given storage entity 26, by storing a single physical copy of the given storage entity on storage device 24, and storing multiple entries 36 whose respective pointers 40 reference the given storage entity. For example, if processor 28 executes an email application (not shown), and an email with an attached storage entity 26 comprising a spreadsheet file is sent to 300 users. When the email application stores the sent emails in the users' email databases, all the users' databases can reference a single instance of the attached spreadsheet file.

Processor 28 comprises a general-purpose central processing unit (CPU) or special-purpose embedded processors, which are programmed in software or firmware to carry out the functions described herein. The software may be downloaded to computer 22 in electronic form, over a network, for example, or it may be provided on non-transitory tangible media, such as optical, magnetic or electronic memory media. Alternatively, some or all of the functions of the processor may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Rule-Based Deduplication

Figure 2:
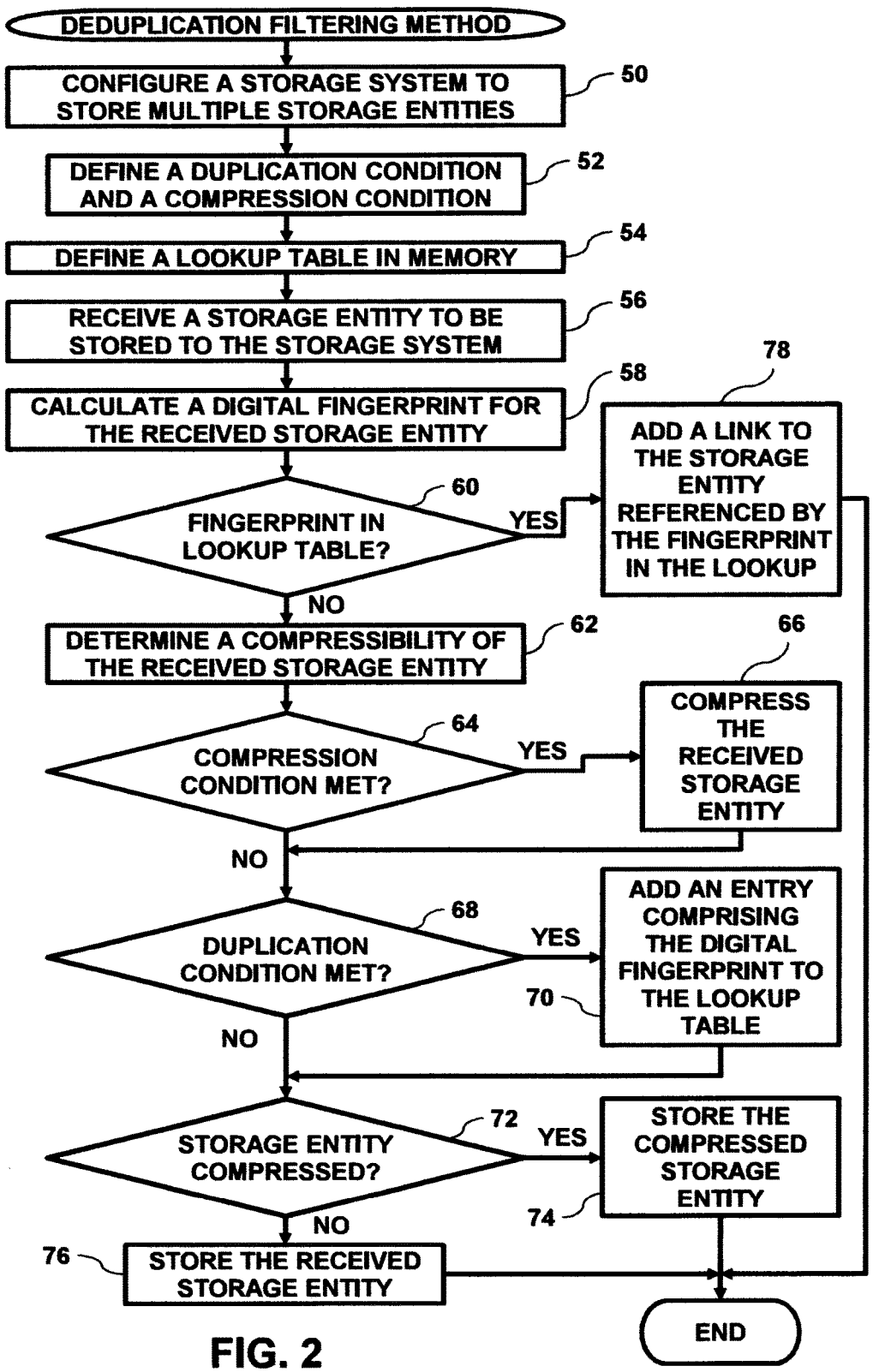
FIG. 2 is a flow diagram that schematically illustrates a method of compression-based filtering for deduplication, in accordance with an embodiment of the preset invention.

FIG. 2 is a flow diagram that schematically illustrates a method of compression-based filtering for deduplication, in accordance with an embodiment of the preset invention. In a configuration step 50, processor 28 executes data access interface 32 in order to configure storage system 20 to store and manage storage entities 26. In a first definition step 52, processor 28 defines a duplication condition and a compression condition for storage entities 26, and in a second definition step 54, the processor defines and initializes lookup table 34. In embodiments of the present invention, each entry 36 in lookup table 34 references a unique storage entity 25. Duplication and compression conditions are described in detail hereinbelow.

In a receive step 56, processor 28 receives a given storage entity 26 to be stored on storage device 24, and in a calculation step 58, processor 28 calculates a digital fingerprint (e.g., a hash functions such as SHA1 or SHA256) for the received storage entity. In a first comparison step 60, if processor 28 does not locate a given digital fingerprint 38 (also referred to herein as a first digital fingerprint) that matches the digital fingerprint calculated in step 58 (also referred to herein as a second digital fingerprint), then in a determination step 62, the processor determines a compressibility of the received storage entity. The compression ratio typically comprises an estimated compression ratio, as described in the following embodiments.

In some embodiments, processor 28 performs compression after deduplication and therefore the processor does not know compression ratios for received storage entities 26 in advance (i.e., prior to compression). In such embodiments processor 28 can use fast estimation techniques on data compressibility. Examples of fast estimation techniques include a micro scale per storage entity compression potential estimator, and a sampling based accurate estimator in case there is ability to lookahead over large amounts of data before being compressed.

In an alternative embodiment processor 28 can use historical data regarding compressibility of specific storage entities 26 as an estimator to the compressibility of the received storage entity going forward. For example, in the alternative embodiment, if the received storage entity comprises a volume, then volumes that have shown to be highly compressible can be filtered from the deduplication process. Additionally, processor 28 can use semantic information on data stored in the storage entities (such as file types or application type) that can also be used to determine compressibility and filter the storage entities accordingly.

In a second comparison step 64, if a compression condition is met, then processor compresses the received storage entity in a compression step 66. For example, the compression condition may direct processor 28 to compress the received storage entity if the estimated compression ratio for the received storage entity is less than than 0.9.

In a third comparison step 68, if the duplication condition is met, then in a first add step 70, processor 28 adds, to lookup table 34, a given entry 36 that includes fingerprint 38 comprising the calculated fingerprint and a pointer 40 that references the given storage object on the storage device. In operation, processor can store update pointer 40 after storing the received storage entity to storage device 24, as described in the description referencing steps 74 and 76 hereinbelow.

In a first embodiment, the duplication condition comprises a threshold for an estimated compression ratio for the received storage entity. For example, the deduplication condition may comprise a threshold X of compressibility. Therefore, processor 28 can process the receive storage entity for deduplication only if its compression ratio R is worse than X, where $R$=compressed output size/storage entity size In some embodiments, processor 28 can update the threshold according to the average compression ratio observed so far in the system. Alternatively, processor 28 can adapt the threshold should according to the usage rate of the system. For example, as long as lookup table 34 can still reside entirely in memory 30, there is no point in filtering chunks for deduplication and the threshold can be X=0, since any compression ratio will be worse than this.

Another variation of the first embodiment is to allow searching for highly compressible chunks in lookup table 34, but not entering new fingerprints of highly compressible chunks into the lookup table. In some embodiments, processor 28 can omit existing entries from lookup table 34 by overwriting them with a new fresh fingerprint 38. In such an embodiment, processor 28 can overwrite a given entry 36 only if a new entry 36 is not significantly more compressible than the given entry. Therefore, processor 28 will overwrite the given entry only if the compression ratio of the new entry is greater than half of the compression ratio of the given entry.

In a second embodiment, processor 28 can filter data with probability proportional to its compression savings. In the second embodiment, if the received file entity has a compression ratio P, processor 28 can generate a random number R (between 0 and 1), and add the received storage entity into lookup table 34 if R is less than P. In other words, the duplication condition comprises a comparison between R and P. For example, if P=0.1, then there is a 10% chance that processor 28 will add a fingerprint 38 for the received file entity to lookup table 34. In this example, processor 28 will add, to lookup table 34, any received storage entities 26 whose respective P=1 (i.e., no compression). In all other cases, processor 28 will not add the received storage entity to the lookup table, but can search the lookup table to see if any entries 36 comprise the same fingerprint 38 (i.e., the received storage entity is a duplicate of a given storage entity 26 already on storage device 24). The second embodiment guarantees that if a very compressible storage entity 26 has very high multiplicity it will eventually be added to the lookup table.

Returning to comparison step 64, if the compression condition was not met, then the method continues with step 68. In a fourth comparison step 72 (i.e., after processing step 68 or step 70), if the received storage entity was compressed in step 66, then in a first store step 74, processor 28 stores the compressed received storage entity to storage device 24, and the method ends. However, if the received storage entity was not compressed (i.e., the compression condition in step 64 was not met), then in a second store step 76, processor 28 stores the (non-compressed) received storage entity to storage device 24, and the method ends.

Returning to step 60, if processor finds a given digital fingerprint 38 that matches the digital fingerprint calculated for the received storage entity, then in a second add step 78, processor 28 stores, for the received storage entity, a link (i.e., a pointer) to the storage entity on storage device 24 that is referenced by the respective entry 36 storing the given (i.e., matching) digital fingerprint, and the method ends. For example, in configurations where a given (i.e., identical) storage entity 26 is stored in multiple directories in system 20, a single copy of the given storage entity is stored on storage device 24, and each of the multiple directories has an entry referencing the single copy of the given storage entity.

While embodiments described herein use a single compression condition and a single duplication condition, using multiple compression conditions and/or multiple duplication conditions is considered to be within the spirit and scope of the present invention. For example, processor 28 can use different compression/duplication conditions depending on the type of storage entity that is received.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method of managing storage of storage entities in a storage device, comprising:

defining, in a memory, a deduplication table comprising multiple entries, each of the entries comprising a first digital fingerprint and a reference to a corresponding unique storage entity in the storage device;

receiving, by a processor, a storage entity to be stored in the storage device;

computing, for the received storage entity, a second digital fingerprint;

detecting, by performing a first comparison between the second fingerprint and the first digital fingerprints in the deduplication table, whether or not the second digital fingerprint is identical to any of the first digital fingerprints in the deduplication table;

upon detecting, in the first comparison, that the second digital fingerprint is identical to a given first digital fingerprint in the deduplication table, creating, for the received storage entity, a link to the unique storage entity corresponding to the first digital fingerprint;

upon detecting, in the first comparison, that the second digital fingerprint is not identical to any of the first digital fingerprints in the deduplication table, determining, by the processor, an estimated compression ratio for the received storage entity;

performing a second comparison between the estimated compression ratio and a first threshold value, and a third comparison between the compression ratio and a second threshold value;

compressing the received storage entity, and storing the compressed storage entity to the storage device, if the second comparison indicates that the estimated compression ratio is less than a first threshold value;

storing the received storage entity in the storage device, uncompressed, if the second comparison indicates that the estimated compression ratio is greater than the first threshold value; and adding, to the deduplication table, an entry comprising the second fingerprint if the second comparison indicates that the estimated compression ratio is greater than a second threshold value.

2. The method according to claim 1, wherein each of the storage entities is selected from a group consisting of a chunk, a block, a file, and an object.

3. The method according to claim 1, and comprising generating a random number, and wherein the second threshold value comprises the random number.

4. The method according to claim 1, wherein the storage device comprises multiple compressed storage entities, and comprising computing an average compression ratio of the compressed storage entities, wherein the second threshold value comprises the computed average compression ratio.

5. The method according to claim 1, and comprising periodically adjusting the second threshold value responsively to an amount of empty space in the deduplication table.

6. An apparatus, comprising:
a storage device;
a memory; and
a processor configured:
to arrange the storage device to store multiple storage entities,
to define, in the memory, a deduplication table comprising multiple entries, each of the entries comprising a first digital fingerprint and a reference to a corresponding unique storage entity in the storage device,
to receive storage entities to be stored on the storage device, and for each given received storage entity:
to compute, for the given received storage entity, a second digital fingerprint,
to detect, by performing a first comparison between the second fingerprint and the first digital fingerprints in the deduplication table, whether or not the second digital fingerprint is identical to any of the first digital fingerprints in the deduplication table;
upon detecting, in the first comparison, that the second digital fingerprint is identical to a given first digital fingerprint in the deduplication table, to create, for the received storage entity, a link to the unique storage entity corresponding to the first digital fingerprint;
upon detecting, in the first comparison, that the second digital fingerprint for the given received storage entity is not identical to any of the first digital fingerprints in the deduplication table, to determine an estimated compression ratio for the given received storage entity,
to perform a second comparison between the estimated compression ratio and a first threshold value, and a third comparison between the compression ratio and a second threshold value,
to compress the given received storage entity, and to store the compressed storage entity to the storage device if the second comparison indicates that the estimated compression ratio is less than a first threshold value,
to store the given received storage entity, uncompressed, if the second comparison indicates that the estimated compression ratio is greater than the first threshold value,
to add, to the deduplication table, an entry comprising the second fingerprint if the third comparison indicates that the estimated compression ratio is greater than a second threshold value.

7. The apparatus according to claim 6, wherein each of the storage entities is selected from a group consisting of a chunk, a block, a file, and an object.

8. The apparatus according to claim 6, wherein the processor is configured to generate a random number, and wherein the second threshold value comprises the random number.

9. The apparatus according to claim 6, wherein the storage device comprises multiple compressed storage entities, wherein the processor is configured to compute an average compression ratio of the compressed storage entities, and wherein the second threshold value comprises the computed average compression ratio.

10. The apparatus according to claim 6, wherein the processor is configured to periodically adjust the second threshold value responsively to an amount of empty space in the deduplication table.

11. A computer program product for managing storage of storage entities in a storage device, the computer program product comprising:
a non-transitory computer readable storage medium having computer readable program code embodied therewith, the computer readable program code comprising:
computer readable program code configured to define, in a memory, a deduplication table comprising multiple entries, each of the entries comprising a first digital fingerprint and a reference to a—corresponding unique storage entity in the storage device;
computer readable program code configured to receive a storage entity to be stored in the storage device;
computer readable program code configured to compute, for the received storage entity, a second digital fingerprint;
computer readable program code configured to detect, by performing a first comparison between the second fingerprint and the first digital fingerprints in the deduplication table, whether or not the second digital fingerprint is identical to any of the first digital fingerprints in the deduplication table;
computer readable program code configured, upon detecting in the first comparison, that the second digital fingerprint is identical to a given first digital fingerprint in the deduplication table, to create, for the received storage entity, a link to the unique storage entity corresponding to the first digital fingerprint;
computer readable program code configured, upon detecting in the first comparison, that the second digital fingerprint is not identical to any of the first digital fingerprints in the deduplication table, to determine an estimated compression ratio for received storage entity;
computer readable program code configured to perform a second comparison between the estimated compression ratio and a first threshold value, and to perform a third comparison between the compression ratio and a second threshold value;
computer readable program code configured to compress the received storage entity, and to store the compressed storage entity to the storage device if the second comparison indicates that the estimated compression ratio is less than a first threshold value;

computer readable program code configured to store the received storage entity if the second comparison indicates that the estimated compression ratio is greater than the first threshold value; and computer readable program code configured to add, to the deduplication table, an entry comprising the second fingerprint if the third comparison indicates that the estimated compression ratio is greater than a second threshold value.

12. The computer program product according to claim 11, and comprising computer readable program code configured to generate a random number, and wherein the second threshold value comprises the random number.

13. The computer program product according to claim 11, wherein each of the storage entities is selected from a group consisting of a chunk, a block, a file, and an object.

14. The computer program product according to claim 11, wherein the storage device comprises multiple compressed storage entities, and comprising computer readable program code configured to compute an average compression ratio of the compressed storage entities, wherein the second threshold value comprises the computed average compression ratio.

15. The computer program product according to claim 11, and comprising computer readable program code configured to periodically adjust the second threshold value responsively to an amount of empty space in the deduplication table.

* * * * *